M. S. LOWER.
METHOD FOR MANUFACTURING RUBBER HOT WATER BOTTLES.
APPLICATION FILED MAY 22, 1919.
1,338,314. Patented Apr. 27, 1920.
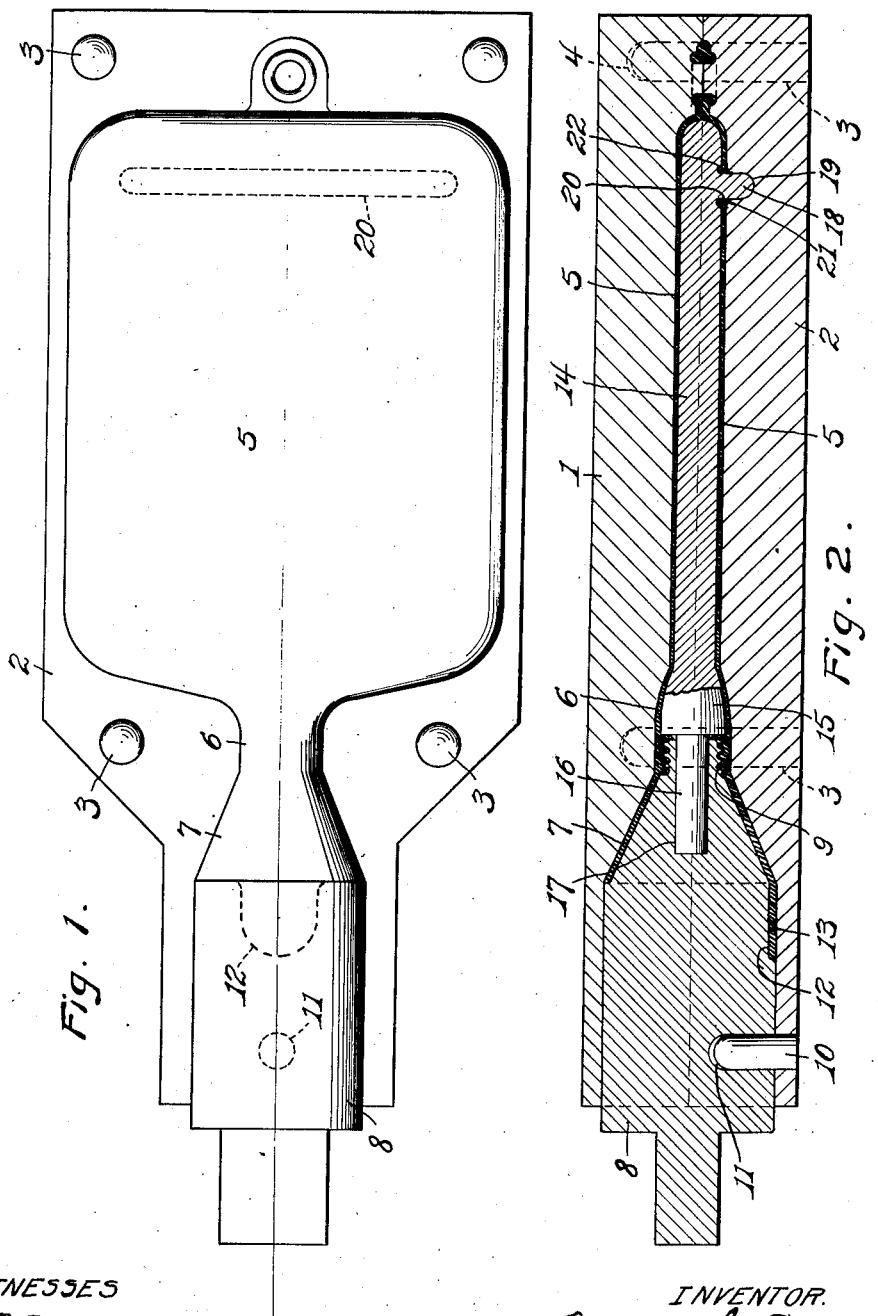

M. S. LOWER.
METHOD FOR MANUFACTURING RUBBER HOT WATER BOTTLES.
APPLICATION FILED MAY 22, 1919.

1,338,314. Patented Apr. 27, 1920.
2 SHEETS—SHEET 2.

WITNESSES
W. B. Erskine
A. L. Dunlap

INVENTOR.
Melvin S. Lower.
BY N. E. Dunlap
ATTORNEY.

UNITED STATES PATENT OFFICE.

MELVIN S. LOWER, OF BARBERTON, OHIO.

METHOD FOR MANUFACTURING RUBBER HOT-WATER BOTTLES.

1,338,314.      Specification of Letters Patent.      Patented Apr. 27, 1920.

Application filed May 22, 1919. Serial No. 298,900.

*To all whom it may concern:*

Be it known that I, MELVIN S. LOWER, a citizen of the United States of America, and resident of Barberton, county of Summit, and State of Ohio, have invented certain new and useful Improvements in Methods for Manufacturing Rubber Hot-Water Bottles, of which the following is a specification.

This invention relates broadly to rubber hot-water bottles, and more specifically to an improved method of manufacturing such bottles.

The primary object of the invention is to provide a method of manufacturing rubber hot-water bottles whereby the latter are rendered wholly seamless and devoid of patched edges.

A further object is to provide a method in which the core or mandrel is removed from the interior of the molded bottle through a side, instead of through an edge, as ordinarily, thus obviating the weakness which is inherent in bottles having seams or patched joints along the edges thereof.

A still further object is to provide an improved method of closing the opening through which the core is removed, whereby said opening is effectually sealed, the closure for said opening being united to the body of the bottle in such a way that it becomes practically an integral part of the latter and is consequently possessed of such stability that it is capable of successfully resisting any strain or weakness-producing distortion which can ordinarily be withstood by the unbroken parts of the bottle body.

In carrying out the method or process which constitutes this invention I employ certain elements of mold structure of which a preferred embodiment is shown in the accompanying drawings.

In said drawings—

Figure 1 is a top plan view of a bottle mold with the top section removed, showing a bottle molded therein;

Fig. 2 is a central longitudinal section of the mold, complete, showing a molded bottle therein;

Referring to said drawings, in which like designating characters distinguish like parts throughout the several views—

Figure 3:
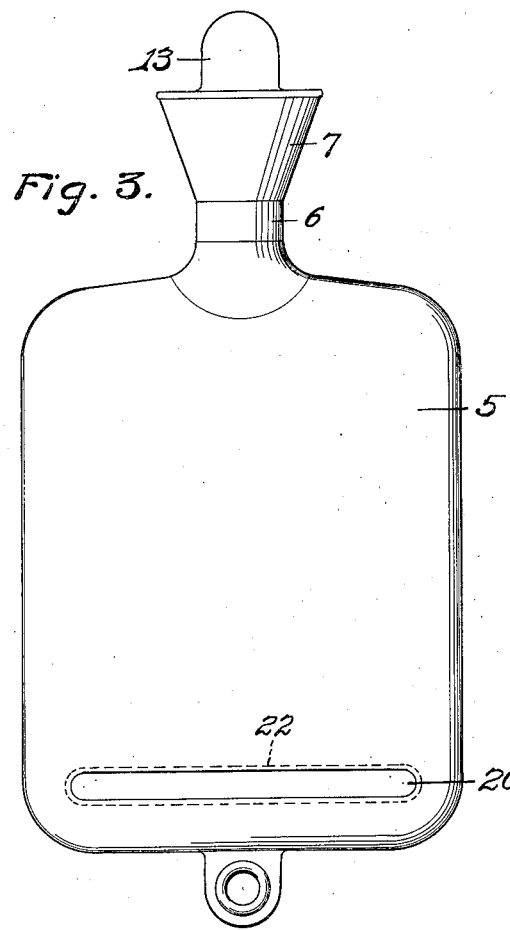
Fig. 3 is a plan view of a finished bottle constructed in accordance with my improved method.

1 and 2 respectively indicate the upper and lower halves or sections of a mold, said sections being designed to be held in their proper relative positions by means of dowels 3 carried by the section 2 which fit in suitably located registering sockets 4 provided in the section 1. The adjacent faces of said sections are cored out or recessed so that when they are fitted together a chamber is constituted which has the general contour of the exterior of the bottle which is to be formed. As is most clearly shown in Fig. 2, it is designed that the body portion of the bottle shall have substantially flat parallel sides 5, the neck 6 shall be substantially cylindrical, and the funnel portion 7 shall be tapered, as ordinarily; hence, the shape and contour of the adjacent faces of said mold sections are such that the mentioned forms of the parts will thereby be imparted to the exterior of a bottle molded within said chamber.

At the end at which the funnel 7 and neck 6 are to be formed, provision is made in the mold sections 1 and 2 for the reception of a funnel-and-neck core 8 which is tapered adjacent to its inner end to conform to the shape desired for the interior of said funnel and which has its said inner end cylindrical in form and exteriorly threaded for the reception of the usual threaded neck piece 9 of sheet metal which is to be vulcanized within the neck of the bottle. Said funnel-and-neck core is secured in place on the lower mold section 2 by means of one or more dowels 10 carried by the lower section 2 and adapted to be received in suitably located registering openings or sockets 11 provided therefor in said core, as shown in Fig. 2. Provided in the under face of said funnel-and-neck core is a recess 12 in which is formed the usual lug 13 by means of which the bottle may be suspended in upright position, such lug having subsequently applied thereto a suitable eye or gromet (not shown) to adapt it for suspension.

A one-piece core 14 of metal is provided whereby the bottle is shaped interiorly. Said core, which is designed to coöperate, or serve in conjunction, with the mold sections to give form to the bottle, has a contour to substantially correspond with the shape desired for the interior of the bottle, the body portion thereof being substantially flat with rounded edges while that portion which coöperates with the funnel-and-neck core 8 has an approximately cylindrical form, as shown at 15, Fig. 2. A reduced stem 16 formed integral with said core 14 extends axially from the portion 15 into a socket 17 provided therefor in the adjacent end of the funnel-and-neck core for maintaining the properly alined relation of said cores.

Formed on one face of the core 14 adjacent to the end opposite that which carries the neck-shaping portion 15 is a transverse rib or bead 18 which fits closely in a groove or channel 19 provided therefor in the adjacent mold section 2 whereby said end of said core is firmly anchored in place with respect to said section.

In carrying out the method involved in the present invention substantially the following steps are employed: A sheet of unvulcanized rubber cut to shape is first laid within the bottle-shaping cavity of the lower mold section 2. Then, with the metal neck-piece 9 screwed upon the cylindrical threaded end of the funnel-and-neck core 8, the stem 16 of the metal core 14 is introduced in the socket 17 of said core 8 and said cores are together laid in position with the dowel or dowels 10 seated in the socket or sockets 11 of the core 8 and with the anchor 18 of core 14 seated in the groove 19. Another properly shaped sheet of the unvulcanized rubber stock is then laid over the core 14 and the conical inner end of the core 8, after which the upper mold section 1 is superposed thereon with the dowels 3 of section 2 received by the sockets 4 of section 1. The mold with its parts assembled as described is next subjected to pressure and to the vulcanizing heat of a hot press until fully vulcanized. During vulcanization the abutting edges of the two sheets of rubber become intimately united throughout to form an integral article devoid of seams or joints.

Having removed the mold from the press, the upper mold section 1 is first lifted off, after which the cores 8 and 14 with the bottle formed thereon are together removed from the lower mold section 2. The core 8 is then freed and removed by rotation to unscrew the threaded end thereof from the metal neck piece 9, which latter has become firmly embedded within the neck of the bottle during vulcanization. The core 14 is then removed from the interior of the bottle body by withdrawing the same through a transverse open slot 20 which is formed in said body through the instrumentality of the anchor 18 engaged with the groove 19.

The anchor 18 in the core 14 is closely surrounded by a shallow groove 21 in which, during the process of vulcanizing, a small inwardly projecting bead 22 is formed on the bottle about the inside edge of the slot 20.

Figure 4:
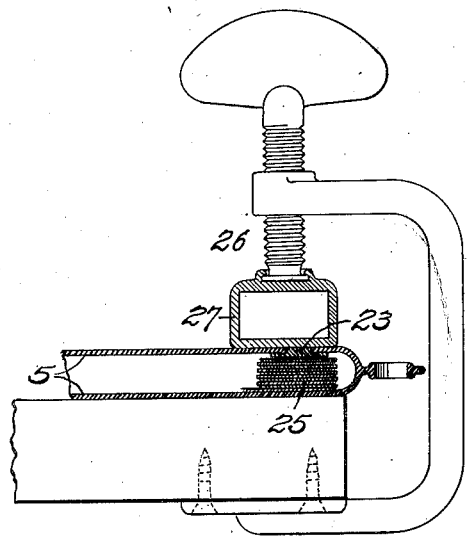
Fig. 4 is a partial longitudinal section of a bottle, illustrating the manner in which the closure is vulcanized in the opening through which removal of the core is effected.
Figure 5:
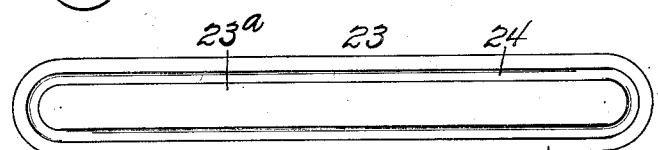
Fig. 5 is an enlarged top plan view of the closure; and—
Figure 6:
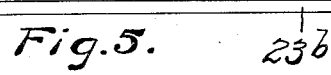
Fig. 6 is a cross section of the same.

A rubber plug, generally designated by the numeral 23, is provided as a closure for the slot 20, the same consisting, as is most clearly shown in Figs. 5 and 6, of a central body portion 23ª of the size and shape of said slot, and an integral body-encircling flange 23ᵇ of suitable width, said flange having in its upper face in closely encircling relation to said body 23ª a shallow groove 24 corresponding in size and contour with the bead 22 of the bottle. Following the application of vulcanizing cement to the inner beaded edge of the slot 20 and to the upper faces of the flange 23ᵇ of the plug, the application of the plug 23 is effected as follows: A pad 25 of suitable flexible material is introduced within the bottle to occupy a position directly underlying the slot 20, said pad being preferably composed of a length of cloth or paper folded upon itself a sufficient number of times to render its thickness approximately equal to the distance between the opposite walls of the bottle body when said walls are in their natural parallel relation. The plug 23 is then inserted through said slot 20 and adjusted to occupy a seated position on said pad with its body 23ª received in said slot and with the bead 22 received in the groove 24 of said plug. A suitable vulcanizing device, preferably of the clamp type exemplified at 26 in Fig. 4, is then applied to the bottle with the steam chamber 27 thereof in such position that the interengaged cemented edges of the bottle and plug will be intimately united by vulcanizing heat from said chamber.

Following vulcanization of the plug or closure 23 to the bottle, as described, the clamp 26 is removed, and the pad is withdrawn through the neck of the bottle. As is obvious, the withdrawal of the pad may be readily accomplished by pulling upon an end of the strip composing it to cause the same to unfold.

It will be observed that the weakness which is ordinarily created in rubber hot-water bottles by removing the core through an opening in the edge of the bottle and then closing such edge-opening by vulcanizing, is obviated in my process wherein, as described, the core-removal opening is provided in one of the flat parallel walls of the bottle where it is possible to so intimately unite the bottle and closure by vulcanization that they constitute a practically integral structure.

It will further be noted that the anchoring means constituted by the anchor 18 seated in the channel 19 provides for the effectual prevention of shifting movement of the core 14 with respect to the mold sections 1 and 2 and, consequently, guards against the formation of thin, weak edges in the bottle.

What is claimed is—

1. The method of making rubber hot-water bottles, which consists in vulcanizing the body, neck and funnel in an integral structure around a core and at the same time forming an opening in one of the parallel sides of said body remote from the edges of the latter, removing said core through said opening, inserting a supporting element within said body in underlying relation to said opening, introducing a formed plug of rubber in said opening in seated relation to said element and in interlocking relation to said body, vulcanizing said plug in the recited position for closing said opening, and finally withdrawing said element through the neck of the bottle.

2. The method of making rubber hot-water bottles, which consists in vulcanizing the body, neck and funnel in an integral structure around a body shaping core and a funnel-and-neck shaping core, and at the same time forming an opening in one of the parallel sides of said body remote from the edges of the latter and with an interiorly located bead bordering said opening, removing said funnel-and-neck core by unscrewing the same from the neck of the bottle, removing said body core through the said opening, inserting in said opening a formed rubber plug having a flange with a groove therein corresponding to the opening-bordering bead, arranging said plug with said bead in the groove thereof and then vulcanizing said plug in said position for permanently closing said opening.

3. The method of making rubber hot-water bottles, which consists in vulcanizing the body, neck and funnel in an integral structure around a separable core in a mold and at the same time forming an opening in one of the parallel sides of said body remote from the edges of the latter, then withdrawing the body-shaping core through said opening, inserting a yieldable pad within said body in underlying relation to said opening, introducing in said opening in seated relation to said pad a previously vulcanized flanged plug of rubber with the flange thereof underlying the edges defining said opening, vulcanizing said plug in place for closing said opening, and then withdrawing said pad through the neck of the bottle.

4. The method of making rubber hot-water bottles, which consists in vulcanizing the body, neck and funnel in an integral structure around a separable core in a mold and at the same time forming an opening in one of the parallel sides of said body remote from the edges of the latter and with an interiorly located bead bordering said opening, then withdrawing the body shaping core through said opening, introducing a yieldable pad within said body in underlying relation to said opening, inserting through said opening a pre-formed plug of rubber having a flange with a groove in its outer face to correspond with the opening-bordering bead, disposing said plug in seated relation to said pad with the body thereof in said opening, with the flange thereof underlying the edges of the bottle body defining said opening, and with said bead received in the groove thereof, vulcanizing said plug in said position for permanently closing said opening, and finally withdrawing said pad through the neck of the bottle.

5. The method of making rubber hot-water bottles, which consists in vulcanizing the body, neck and funnel in an integral structure around a separable core in a mold and at the same time forming in one of the parallel sides of said body adjacent to, but at a spaced distance from, the end opposite said neck a transverse opening of a length less than the width of said body, then withdrawing the body shaping core through said opening, introducing a suitable pad of flexible material within said body in underlying relation to said opening, disposing a pre-formed plug of rubber in seated relation to said pad with a portion thereof received within said opening, then vulcanizing said plug in place for sealing said opening, and finally withdrawing said pad through the neck of the bottle.

6. The method of making rubber hot-water bottles, which consists in vulcanizing the body, neck and funnel in an integral structure around a separable core in a mold and at the same time forming in one of the parallel sides of said body adjacent to, but at a spaced distance from, the end opposite said neck a transverse opening of a length less than the width of said body, then withdrawing the body shaping core through said opening, introducing within said body in underlying relation to said opening, a pad composed of flexible material folded upon itself a plurality of times disposing in seated relation to said pad a pre-vulcanized plug of rubber comprising a body portion of the size and shape of said opening and a flange surrounding the base of said body portion, with said body portion received in said opening and said flange underlying the edge of the bottle body which defines said opening, then vulcanizing said plug in the recited position, and finally withdrawing said pad through the neck of the bottle.

7. The method of making rubber hot-water bottles, which consists in vulcanizing the body, neck and funnel in an integral structure around a core having a transverse rib in one of the parallel faces thereof and within a mold having a groove in which said rib is received for anchoring said core and said mold in fixed relation, then removing the vulcanized structure from the mold, then withdrawing said core through the opening in the body formed by said anchoring means, then introducing a yieldable pad through said opening into underlying relation to the latter, then inserting a pre-vulcanized plug of rubber in seated relation to said pad with a portion thereof conformably received within said opening, then vulcanizing said plug to the apertured side of the bottle for sealing said opening, and finally withdrawing said pad through the neck of the bottle.

8. The method of making rubber hot-water bottles, which consists in vulcanizing the body, neck and funnel in an integral structure around a core having a transverse rib in a face thereof with a groove surrounding said rib, and within a mold having a transverse channel in which said rib is received for anchoring said core with respect to said mold, then removing the vulcanized structure from the mold, then withdrawing said core through the interiorly-beaded opening in the body formed by the groove-surrounded rib, then introducing a yieldable pad through said opening into underlying relation to the latter, then inserting through said opening into seated relation to said pad a pre-vulcanized plug of rubber consisting of a body shaped to be conformably received within said opening and a grooved flange surrounding said body, arranging said plug with the body thereof in said opening and with the opening-surrounding bead of the bottle seated in the groove of the flange thereof, then vulcanizing said plug to the side of the bottle in the recited position, and finally withdrawing said pad from the bottle.

In testimony whereof, I affix my signature in presence of two subscribing witnesses.

MELVIN S. LOWER.

Witnesses:
JOHN A. MORNEWECK,
ROY. G. MARSHALL.